United States Patent [19]
Gitlin et al.

[11] Patent Number: 5,791,090
[45] Date of Patent: Aug. 11, 1998

[54] VARIABLE TENSION ROOFING AND STRUCTURAL PROTECTIVE HARNESS

[76] Inventors: Harris M. Gitlin, 1646 Quincy Pl., Honolulu, Hi. 96782; James W. Maloney, Jr., 3156 A Mere Point Rd., Brunswick, Me. 04011

[21] Appl. No.: 155,010

[22] Filed: Nov. 19, 1993

[51] Int. Cl.⁶ ................................................ E04D 5/00
[52] U.S. Cl. ........................ 52/4; 52/23; 52/DIG. 12
[58] Field of Search ................ 52/3, 4, 23, DIG. 11, 52/DIG. 12

[56] References Cited

U.S. PATENT DOCUMENTS

| | | | |
|---|---|---|---|
| 269,018 | 12/1882 | Crowell et al. | 52/23 |
| 352,424 | 11/1886 | Owen et al. | 52/23 |
| 490,780 | 1/1893 | Zimmerman | 52/23 |
| 905,002 | 11/1908 | Rosenberg | 74/423 |
| 1,918,423 | 7/1933 | Persinger | 52/3 X |
| 2,306,537 | 12/1942 | Hamm | 52/23 |
| 2,445,368 | 7/1948 | Scharnhorst | 52/3 |
| 2,455,237 | 11/1948 | Davis | 52/3 X |
| 3,054,151 | 9/1962 | Shankland | 52/23 |
| 3,715,843 | 2/1973 | Ballinger | 52/3 |
| 3,869,836 | 3/1975 | Allen | 52/23 |
| 3,949,527 | 4/1976 | Double et al. | 52/4 |
| 4,015,376 | 4/1977 | Gerhardt | 52/4 |
| 4,283,888 | 8/1981 | Cros | 52/3 |
| 4,397,122 | 8/1983 | Cros | 52/3 |
| 4,632,329 | 12/1986 | Burley | 52/3 X |
| 4,795,415 | 1/1989 | Francis | 52/3 X |
| 4,858,395 | 8/1989 | McQuirk | 52/3 |
| 4,897,970 | 2/1990 | Double et al. | 52/3 X |
| 5,174,073 | 12/1992 | Sabo | 52/3 |

OTHER PUBLICATIONS

Stokes, Robert; "A Superior Environmental Protection Structure: The Superspan System" (Australia 1992).

*Primary Examiner*—Carl D. Friedman
*Assistant Examiner*—Kevin D. Wilkens
*Attorney, Agent, or Firm*—Robert Carson Godbey

[57] ABSTRACT

An apparatus and method for securing a structure and its roof against damage from high winds. A harness of a plurality of strap-like elements runs from or over the roof of a structure to anchors in the ground, with a coarse fabric such as shadecloth attached to and running between the strap-like elements. As the wind velocity increases, the wind pressure against the shadecloth in the area between the eaves of the roof and the ground increases, thus increasing the downward tension on the harness and further securing the roof and structure against damage.

9 Claims, 4 Drawing Sheets

FIG. 1

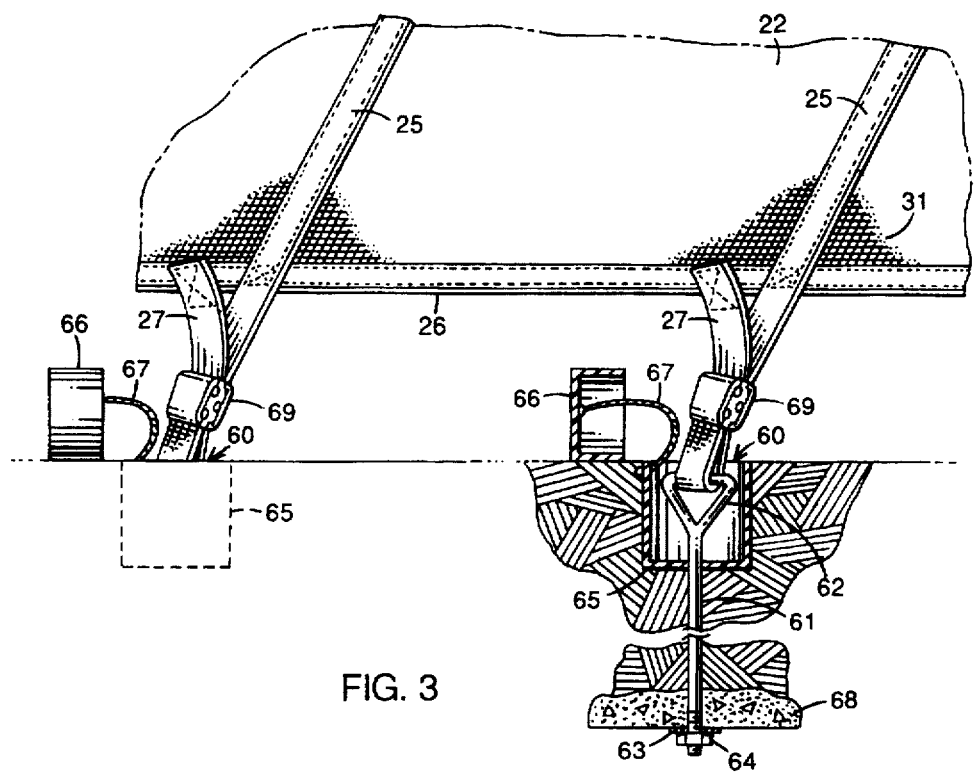
FIG. 3
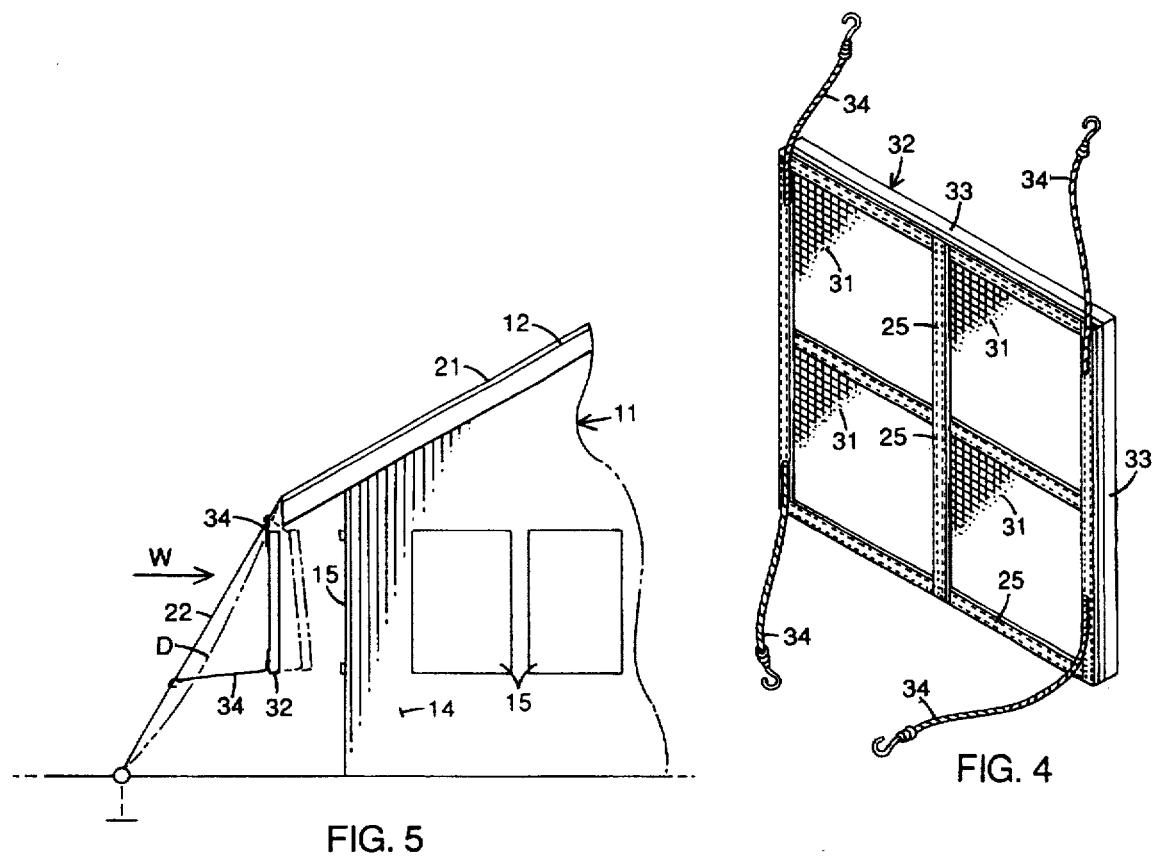
FIG. 5
FIG. 4

VARIABLE TENSION ROOFING AND STRUCTURAL PROTECTIVE HARNESS

BACKGROUND OF THE INVENTION

The present invention relates generally to the roofing systems and structure of buildings, mobile homes, and the like. More particularly, it is an improvement in the existing method and apparatus for securing the roof surface and structure against wind loads that provides increasing tension against the wind loads as wind velocity increases.

DESCRIPTION OF THE PRIOR ART

There has long been a need for stabilizing and securing roof surfaces against the winds that arise during tornados, hurricanes, and other storm conditions. There are several modes of destruction of structures by very high winds, including: (1) a lifting of roof parts, or other parts, usually on the leeward side followed by collapse due to wind pressures; (2) bit by bit destruction due to loss of roof corners, edges, overhangs, or projecting parts on any side; (3) overturning of a well-constructed structure, or twisting of structure by wind lift and pressure on the windward side, breaking windows and resulting in internal pressures, weakening the structure's inherent strength; and (5) partial loss of roof waterproofing and resultant water damage internally.

Early efforts to address this need include apparatus that strap the roof surfaces to the building and are anchored to the ground (e.g., U.S. Pat. Nos. 269,018, Crowell & Dawson, and 490,780, Zimmerman). More modern efforts include tie-down devices that continue to use straps or cables anchored to the ground (e.g., U.S. Pat. Nos. 3,869,836, Allen, and 3,054,151, Shankland).

Current systems suffer from the constant tensions they place on the roof surfaces, even when there are no unusual wind loads. To be effective against the force of high winds, the current systems must be placed under substantial tension at all times. This constant tension places strain on the structure and can be seriously loosened by slight give or movement of the anchors under load.

Furthermore, permanently attached strapping systems under tension and anchored to the ground may subject the roof and building to damage in cold climates, where ground frost may cause heaves in the ground or similar displacing forces that alter the location of the anchors in the ground and thus may unexpectedly increase the tensions the strapping systems normally place on the roof and building. Controlled extension devices attached to the strapping materials may minimize such problems, but increase cost and complexity (see, e.g., U.S. Pat. No. 3,949,527, Double et al.).

The prior art does not disclose any invention with the desirable characteristic of increasing tension on the roof and structure when it is most needed, when wind velocities increase.

SUMMARY OF THE INVENTION

The object of the present invention is to provide an apparatus and method for securing roof surfaces, buildings, and other structures against damaging winds where the downward force of the apparatus increases as wind velocity increases.

A further object of the present invention is to provide protection for the structure against damage from wind-borne objects that might otherwise be driven against the building.

The invention utilizes a plurality of flexible strap-like elements, such as wire rope, wire cable, fabric rope, or fabric strap or webbing ("strap" or "strapping"), extending over the building and roof surface and anchored into the ground, forming a protective "harness" or network of strapping. The invention also utilizes in combination with the strap harness and anchors, and securely attached to the strapping and running between the straps, a sheet of fabric, such as commercially available knit or woven polyethylene or polypropylene fabric, commonly known as shadecloth, or other similar coarse fabric ("shadecloth"). As wind velocities increase, the force of the wind against the shadecloth increases the downward tension on the strap harness, thus securing the roof surface against the wind.

A further benefit of the invention is that the shadecloth between the strapping will reduce wind load against the vertical surfaces of the structure and prevent loss of roofing parts between strap bands, and serve to slow down or stop small flying objects.

BRIEF DESCRIPTION OF THE DRAWINGS

The features of the invention are set out in the following with a specific reference to the accompanying drawings, in which the same characters of reference are employed to identify corresponding parts:

FIG. 3 is a cutaway detail view of the strap harness, on an enlarged scale, and showing one embodiment of an anchoring means.

FIG. 4 is a perspective view, on an enlarged scale, showing a protective assembly for windows and other vertical structures.

FIG. 5 is a partial end elevation view of a further embodiment of the invention, showing the protective assembly installed on the strap harness, and showing the movement from wind deflection.

DESCRIPTION

Figure 1:
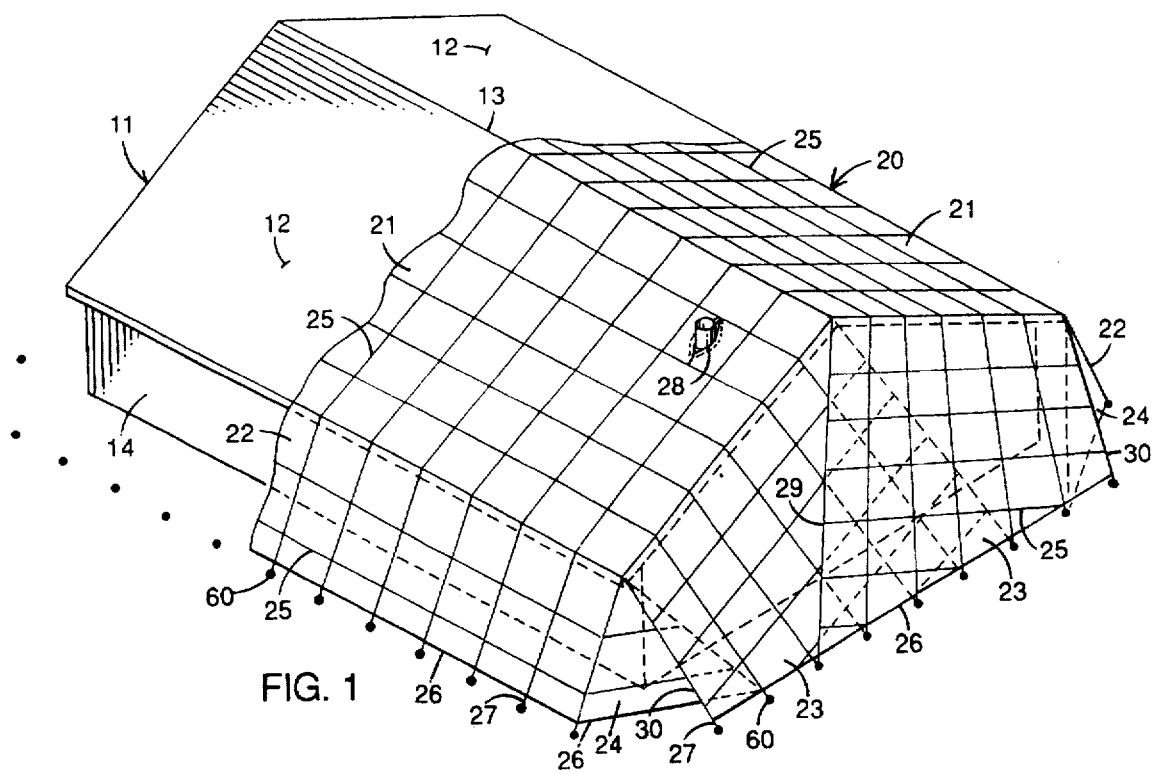
FIG. 1 is a perspective, partial cutaway view of a structure showing a strap harness and attached shadecloth embodying the features of the invention.

Referring initially to FIG. 1, a structure 11 is shown in representative form, including a roof 12, roof peak 13, and side walls 14. Stretching across the roof according to the invention is a strap harness assembly 20, comprising a plurality of individual straps 25 each extending from the roof peak 13, over the eave of the roof, and attached securely to a strap perimeter 26, which is anchored firmly in the ground by the tie-down strap 27. The embodiment represented in FIG. 1 allows such shadecloth roof openings 28 as are necessary, a harness and shadecloth overlap area 29 at the end of the structure, and an opening 30 for people and utilities to go in and out of the structure. Also as will be seen from the embodiment represented in FIG. 1, the plurality of individual straps can extend beyond the strap perimeter, and thus in this embodiment many tie-down straps are the terminating end of the straps forming the body of the strap harness assembly. This allows a continuous strap to run from one anchor, over the roof peak, to a corresponding anchor on the opposite side of the structure.

Figure 2:
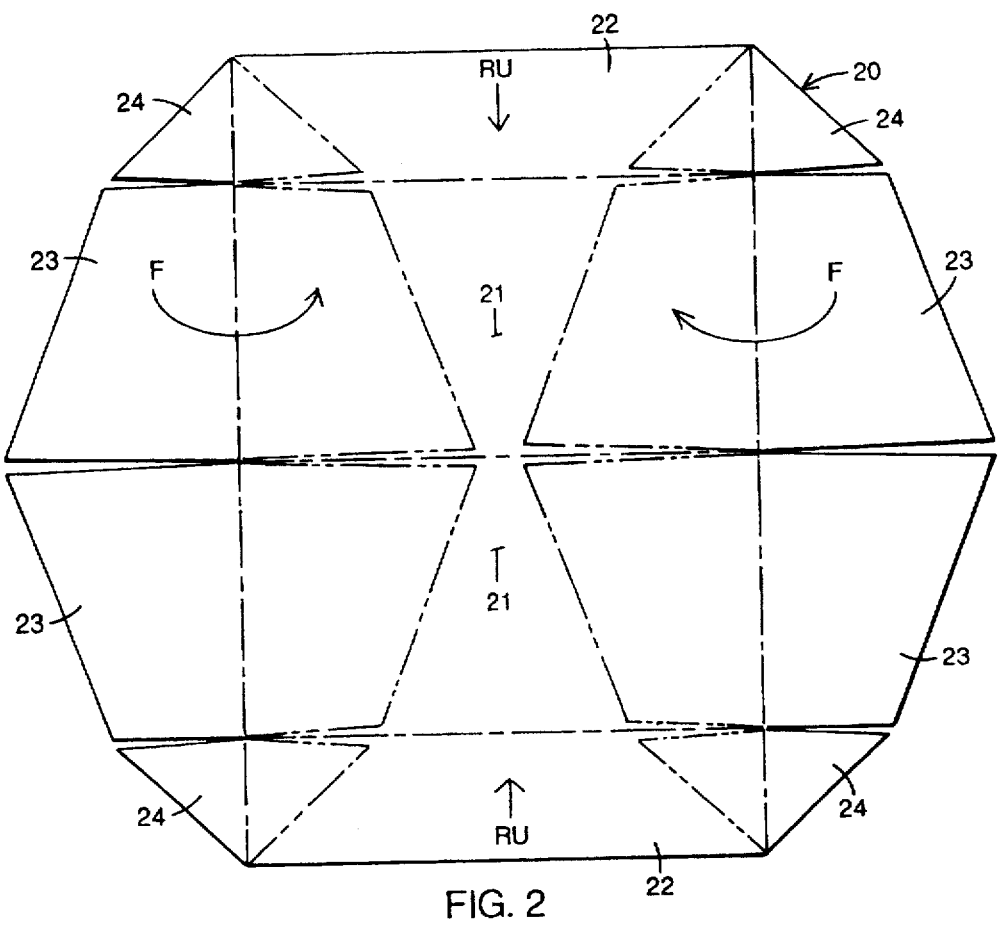
FIG. 2 is a top view of the harness laid out flat indicating how ends are folded in and direction of roll-up for stowage.

Referring additionally to FIG. 2, it will be seen that the strap harness assembly 20, includes the harness roof area 21, harness side wall area 22, harness end wall area 23, and harness closure flap 24, and can be folded, as shown by arrows F, and rolled up, as shown by arrows RU. The apparatus can thus be stored when not in use, and easily deployed when needed.

Referring additionally to FIG. 3, it will be seen that fabric 31 is run between each strap 25 and attached securely thereto. Although any strong fabric will serve, in the preferred embodiment of the invention, the fabric will be made of a coarsely knit or woven material securely attached to the strapping and running between the straps. Desirable qualities for such fabric include a uniform open weave or knit that will allow the passage of air through the fabric, and construction from material that is flexible, ultraviolet and temperature resistant, strong, and of low cost. Commercially available knit or woven polyethylene or polypropylene fabric, commonly known as shadecloth, possesses all these desirable qualities and comes in various percentages of "shade." The shade is dependent upon the weave of the shadecloth, and generally represents the percentage of opaque thread to holes in the weave of the fabric, or porosity of the fabric. Shadecloth with a lower percentage shade level rating has a more open weave and is more porous to light; similarly, a higher shade level rating indicates a cloth with a tighter weave and one that is less porous to light. The shade level of shadecloth is a measure not only of its porosity to light, but also of its porosity to wind. In the preferred embodiment of this invention, shadecloth of a 60% to 75% shade level is desirable.

In this embodiment of the invention each tie-down strap 25 is attached by a tie-down clip/buckle 69 to the tie-down ring 62 of the anchor rod 61 of the anchor assembly 60. The anchor rod is attached by nut 64 and washer 63 to anchor material 68 embedded in the ground. A cup 65 and cup cover 66, held to the cup by retainer lanyard 67, protect the tie-down ring 62 when the harness is not deployed.

The spacing of the anchor assemblies 60 is preferably one per thirty-five (35) square feet of structure, with the spacing of the tie-down straps 27 approximately four feet apart. There is preferably approximately one linear foot of strap 25 for every square foot of structure, and preferably approximately three square feet of shadecloth 31 for every square foot of structure. The tensile strength of the straps 25, the strap perimeter 26, and the tie-down straps 27, is preferably a minimum of 3000 pounds.

It will be appreciated that while such anchors will often be embedded or otherwise secured directly to the ground, in certain embodiments of the invention the anchoring means may be attached indirectly to the ground, as, for example, where the tie-down straps are attached to an adjacent building or structure that is itself securely anchored to the ground.

Further protection for windows and the vertical sides of the structure can be accommodated in a further embodiment of the invention by suspending an additional protective assembly, such as additional shadecloth or protective fabric 31, under the harness to stop particles that might otherwise blow through the shadecloth and damage the windows or sides of the protected structure. Referring additionally to FIG. 4, it will be seen that such a protective assembly 32, can also be constructed of shadecloth 31 and strap harness 25 framed by padding 33 and attached by an elastic means, such as a bungee cord 34, to the harness. As shown in FIG. 5, this protective assembly can be attached to the harness side wall area 22 and provide said additional protection for structure side walls 14 and windows 15.

Figure 6:
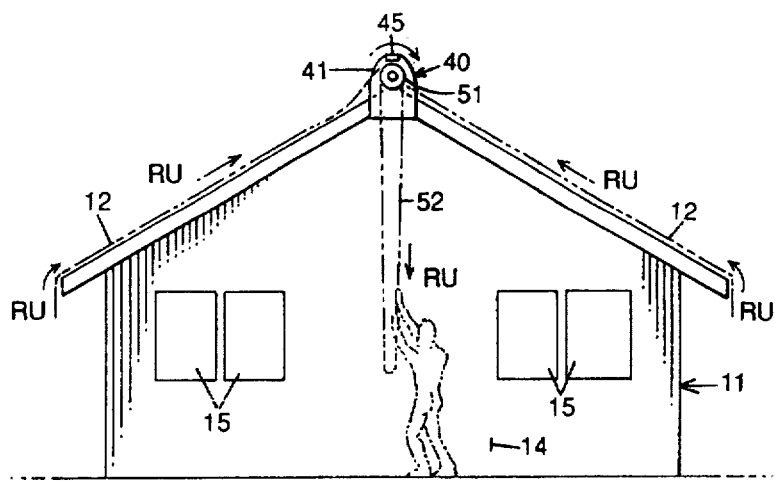
FIG. 6 is an end elevation view of one embodiment of the invention, in which a mechanism for storing the strap harness and attached shadecloth on the roof peak is incorporated in the apparatus.
Figure 7:
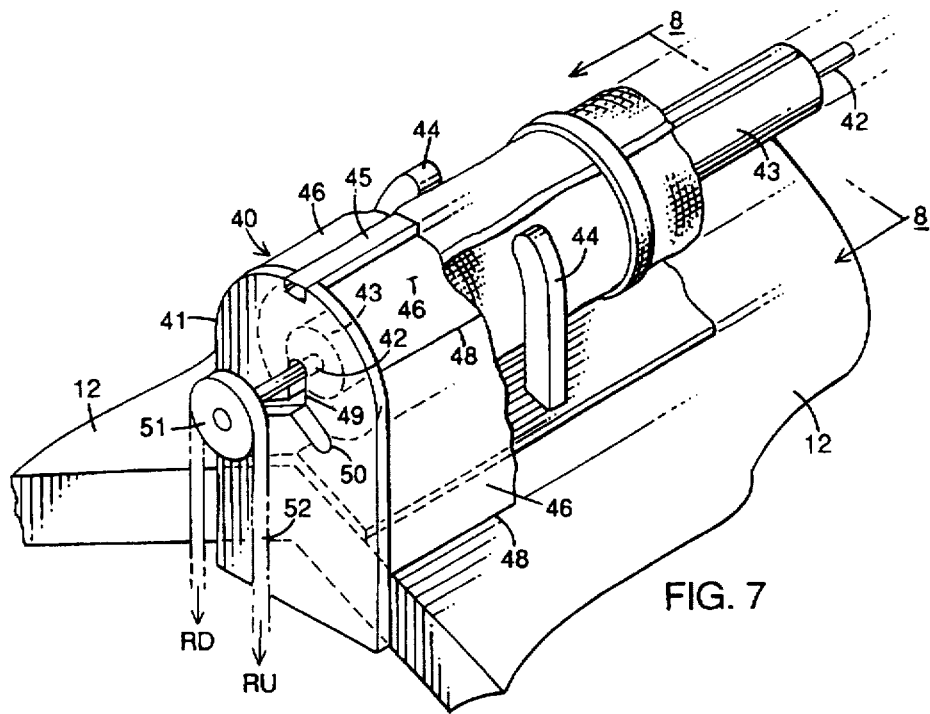
FIG. 7 is a partial perspective view, on an enlarged scale, showing details of the storing mechanism.
Figure 8:
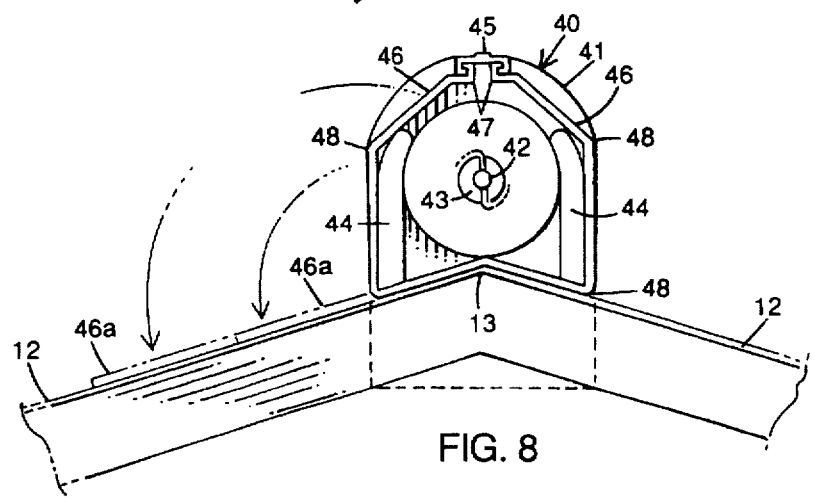
FIG. 8 is a sectional view, taken through view 8—8, showing the stowage cover and the stowage cover's fold down direction.

On certain larger structures the weight of the apparatus is too great to allow easy installation. In one embodiment of the invention, making additional reference to FIG. 6, the apparatus incorporates a storage assembly 40 for storing the strap harness and attached shadecloth on the peak of the roof 12. By use of a chain/cable 52 the strap harness can be rolled up, as indicated by the directional arrows RU, or rolled down over the roof 12. Referring additionally to FIG. 7, and the sectional view through view 8—8 shown in FIG. 8, it will be seen that the stowage assembly of this embodiment is affixed to the roof peak 13 and incorporates a shaft 42 and split roller 43 between end supports 41. As the chain/cable 52 is pulled to roll-up RU or roll-down RD the assembly, the chain/cable rotates pulley/gear 51 attached to shaft 42 through shaft slot 49 and lateral drift slot 50. As the shaft rotates, split roller 43 winds the wire/strap harness assembly up or down through cradle guides 44. A stowage cover of clamshell function is shown both closed 46, angled at fold-up creases 48 and held securely closed with sliding retainer 45, and open 46a, lying flat against the roof 12. The individual using the invention must gain access to the roof to remove or install the sliding retainer in order to open and close the protective housing or cover for the harness.

Figure 9:
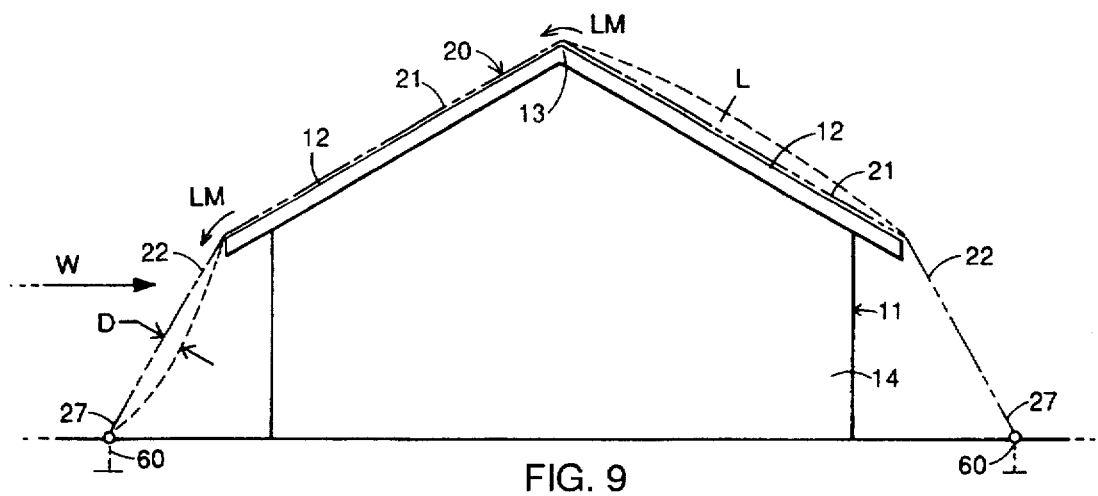
FIG. 9 is an end elevational view of one embodiment of the apparatus and protected structure showing a strap harness and attached shadecloth embodying the features of the invention, and showing the utilization of anchoring devices and a portion of the strap harness and attached shadecloth combination, and showing the increase in arc length, from roof eave to anchor, of the strap harness as wind velocities increase.

With further reference to FIG. 9, it will be apparent that the apparatus, when applied to a structure, will have approximately ten (10) feet of length for each strap from eave to anchor for a one story structure and approximately 20 feet of length for each strap from eave to anchor for a two story structure. Generally, the strapping from roof eave to anchor should extend beyond the vertical line from the eave to the ground, thus forming an oblique angle between a horizontal line at ground level and the exterior of the harness, as illustrated in FIG. 9. Wind direction is indicated by arrows W, and will strike the harness at the oblique angle; deflection is indicated by the arrows D; lift is indicated by L and lateral movement by LM. The strap would be in tension, holding the structure down and together. The shadecloth, or equivalent, attached to the strap members would reduce wind velocity inside the area enclosed by the apparatus, and thus reduce the wind pressure against the vertical walls of the structure. The wind pressure against the shadecloth would cause a tensioning and bending of the strap. This tensioning of the strap would increase the downward force of the apparatus and thus the holding effect of the apparatus is increased as wind velocity increases.

This wind response of the apparatus will permit the use of only a modest pre-tensioning of the strap, preferably approximately 50 pounds of tension, and will accommodate any slight stretching in material or bending movement of the anchor eye.

Generally, high winds create increased pressure on the windward side of a structure and reduced pressure on the leeward side of a structure. The reduced pressure on the leeward side of the structure often causes a lift on the roof and side segments of the structure; because structures are normally stronger and more resistant to positive pressures than negative pressures, it is not uncommon for structural failures in high winds to occur by first lifting the leeward elements of the structure, followed by a collapse from windward pressure. It is one object of this invention to reduce pressure on the windward side of the structure, while causing a minimum of additional reduction of pressure on the leeward side of the structure. Accordingly, in the preferred embodiment of the invention a wind-porous fabric such as shadecloth is used to secure the desired effect of reducing pressure on the windward side, increasing the tension on the strap harness to secure the structure, and minimizing the increased lift on the leeward side of the structure.

It will also be appreciated that running continuous straps from one anchor over the roof peak to the anchor on the opposite side of the structure is desirable when possible. This allows the increased tension from the pressure on the windward side of the structure to be transferred over the roof peak and to the leeward side of the structure as well.

Figure 10:
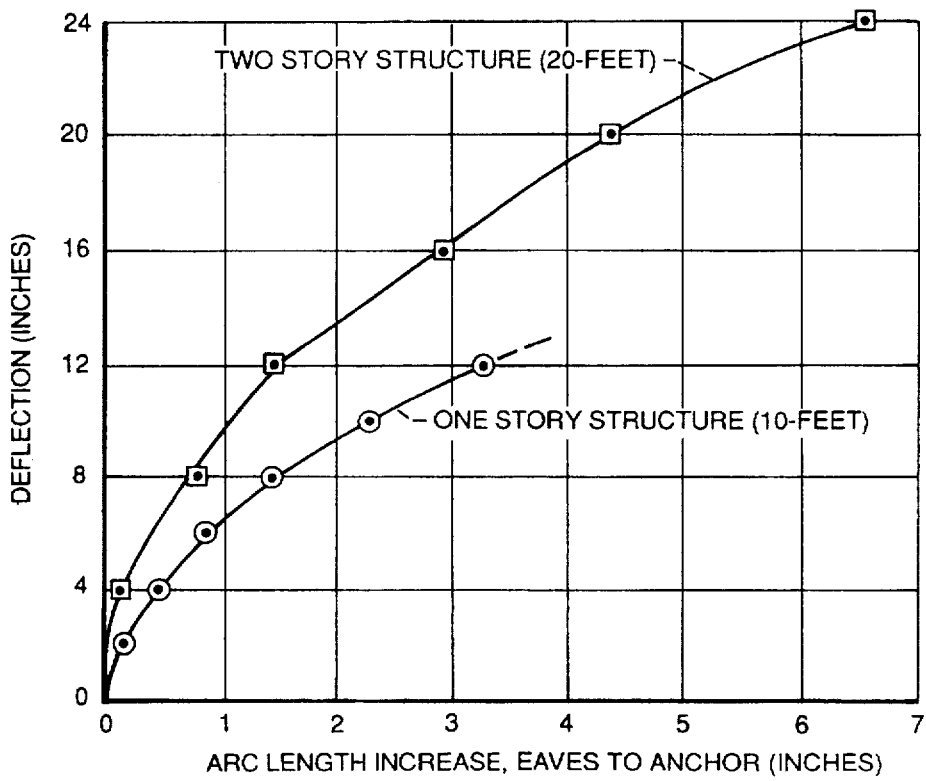
FIG. 10 is a graph of the calculated increase in arc length of the strap harness as wind velocities increase, for both a 10' and 20' length of strap, in one embodiment of the invention.

To illustrate the magnitude of this wind response, exemplary curves are set out graphical form in FIG. 10, calculated for 10 foot and 20 foot straight-line distances from eave to anchor eye, called the chord of an arc. As the wind load causes the strap to bend, forming an arc (calculated as a true arc, which is an approximation of the actual arc that will be formed), there is an increase in strap length in the distance from eave to anchor eye. With reference to the preferred embodiment described above, in which continuous straps running from one anchor over the roof peak to the anchor on the opposite side of the structure are employed, together with a modest pre-tensioning of the straps, and in which the wind pressure against the shadecloth causes a further tensioning and bending of the strap, it will be appreciated that the increase in strap length in the distance from eave to anchor eye is approximately proportional to the increase in tension on the strap. In practice, the magnitude of deflection will vary, but the exemplary curves illustrate the concept of what the increase in tension in the apparatus will be, and show the relationship between wind load and tension in the strap members of the apparatus. The graphs also illustrate that some stretch or "give" in the strap under load would be accommodated by the design, and would be particularly effective against shock (gust) loads.

This variation in tension in response to variable wind velocities is an important feature of the method and apparatus of this invention.

What is claimed is:

1. A harness for securing a building against damaging winds, the harness comprising:
    a. a plurality of strap-like elements extending over the roof of the building said strap-like elements being in contact with the roof along a substantial portion of their length, and said strap-like elements having end portions continuing from the eave of the roof to the ground;
    b. an anchoring means attachable to said strap-like elements to secure the end portions of said strap-like elements to the ground; and
    c. a first sheet of coarsely woven or knitted fabric having a shade or porosity, the ratio of the surface area of the opaque threads of the fabric to the total surface area of the fabric including the interstice between said threads, of 60% to 75%, such that air will pass readily through the fabric, attached to two or more of said strap-like elements, and extending at least partially between said end portions running from the eave of the roof to said anchoring means, for increasing tension on said strap-like elements as wind velocity increases and providing protection to the structure from wind pressure and flying debris.

2. A harness according to claim 1, wherein said first sheet of coarsely woven or knitted fabric is of uniform open weave or knit polyethylene or polypropylene shadecloth.

3. A harness according to claim 1, wherein said strap-like elements have end portions continuing from the eave of the roof to said anchoring means at an angle such that said end portions extend beyond a vertical line from the eave to the ground, thus forming an oblique exterior angle between a horizontal line at ground level and the exterior of said strap-like elements.

4. A harness according to claim 3, wherein said first sheet of coarsely woven or knitted fabric is of uniform open weave or knit polyethylene or polypropylene shadecloth.

5. A harness according to claim 3, further comprising:
    a. A second sheet of fabric mounted vertically by elastic means to said end portions of the strap-like elements between the roof eaves and the ground, and aligned in an approximately parallel plane to the sides of the building, for providing additional protection to the building from flying debris.

6. A harness according to claim 5, wherein said first sheet of coarsely woven or knitted fabric is of uniform open weave or knit polyethylene or polypropylene shadecloth.

7. A harness according to claim 1, further comprising:
    a. a means for storage of the harness when not in use secured to the roof peak and having the strap-like elements of the harness attached thereto.

8. A harness according to claim 7, wherein said means for storage comprises:
    a. a shaft rotatably attached to, and aligned along, the roof peak by support means at each end of said shaft, such that the axis of rotation of said shaft is parallel to the line of the roof peak; and
    b. a split roller mounted upon said shaft having the strap-like elements of the harness attached to said split roller, such that when said split roller and shaft are rotated, the harness will furl about said split roller and shaft for storage.

9. A harness according to claim 8, wherein said support means at each end of said shaft contains means for allowing vertical movement of said shaft, whereby said shaft may move up and down as the harness is furled or unfurled, and wherein said support means at each end of said shaft contains means for allowing lateral drift of said shaft, whereby slight shifting of the shaft from side to side is allowed after the harness is unfurled as the wind loads change.

* * * * *